(12) United States Patent
Ogawa et al.

(10) Patent No.: US 9,782,038 B2
(45) Date of Patent: Oct. 10, 2017

(54) ELECTRIC COOKER (71) Applicant: SUNTEC COMPANY, LIMITED, Tokyo (JP)

(72) Inventors: Tomoyuki Ogawa, Tokyo (JP); Yasuo Wada, Tokyo (JP)

(73) Assignee: Suntec Company, Limited, Sumida-Ku, Tokyo (JP)

(*) Notice: Subject to any disclaimer, the term of this patent is extended or adjusted under 35 U.S.C. 154(b) by 262 days.

(21) Appl. No.: 14/397,863

(22) PCT Filed: May 27, 2014

(86) PCT No.: PCT/JP2014/063965
§ 371 (c)(1),
(2) Date: Oct. 30, 2014

(87) PCT Pub. No.: WO2015/181885
PCT Pub. Date: Dec. 3, 2015

(65) Prior Publication Data
US 2016/0270593 A1  Sep. 22, 2016

(51) Int. Cl.
A47J 37/06 (2006.01)

(52) U.S. Cl.
CPC .... *A47J 37/0611* (2013.01); *A47J 2037/0617* (2013.01)

(58) Field of Classification Search
CPC ............ A47J 37/0611; A47J 2037/0617; A47J 2037/0795; A47J 37/049; A47J 37/0676;
(Continued)

(56) References Cited

U.S. PATENT DOCUMENTS 3,669,006 A * 6/1972 Lee, Sr. ............... A47J 37/0611
425/298
4,483,239 A * 11/1984 Mueller ................. A47J 37/06
16/375
(Continued)

FOREIGN PATENT DOCUMENTS

GB         734193 A  *  7/1955  .............. B62J 6/001
JP    2003-047561 A      2/2003
(Continued)

OTHER PUBLICATIONS

International Search Report for corresponding PCT application dated Jul. 31, 2014.

*Primary Examiner* — David Angwin
*Assistant Examiner* — Joseph Baillargeon
(74) *Attorney, Agent, or Firm* — Davis & Bujold PLLC; Michael J. Bujold (57) ABSTRACT

An electric cooker comprising a lower housing; a lower die mounted on the lower housing; a hinge shaft; an upper housing pivotally mounted at a rear end via the hinge shaft to the lower housing to turn upward from the lower housing; an upper die mounted on the upper housing, a lower surface of the upper die being capable of being disposed on an upper surface of the lower die; an electric heater disposed in at least one of the lower housing and the upper housing and heating at least one of the lower die and the upper die from back to heat dough between the lower die and the upper die; and a hinge-shaft height adjusting unit changing a vertical position of the upper housing pivotally mounted via a hinge shaft by adjusting height of the hinge shaft.

5 Claims, 12 Drawing Sheets (58) Field of Classification Search
CPC ..... A47J 37/0864; F24C 15/16; F24C 15/168; A21B 5/023
USPC ......... 99/372, 377, 379, 390, 380, 381, 376, 99/378; 219/524, 525, 450.1, 451.1; 292/340, 289, 89; 248/466, 200, 244; 297/374; 126/25 A, 154, 41 E; 16/341; 100/257
See application file for complete search history.

(56) References Cited

U.S. PATENT DOCUMENTS

| | | | | |
|---|---|---|---|---|
| 4,601,237 | A | * | 7/1986 | Harter .................. A47J 37/0611 99/349 |
| 7,621,232 | B2 | * | 11/2009 | Bescherer ............ A01K 39/012 119/52.2 |

FOREIGN PATENT DOCUMENTS

| | | | |
|---|---|---|---|
| JP | 2003-304975 | A | 10/2003 |
| JP | 2004-358062 | A | 12/2004 |
| JP | 2007-130149 | A | 5/2007 |
| JP | 2011-512974 | | 4/2011 |
| JP | 2013-202137 | A | 10/2013 |
| WO | 2009/112405 | A2 | 9/2009 |

\* cited by examiner

ELECTRIC COOKER

This application is a National Stage Completion of PCT/JP2014/063965 filed on May 27, 2014.

TECHNICAL FIELD

The present invention relates to an electric cooker for baking bread and snack cakes by inserting dough between a lower die and an upper die and heating at least one of the lower die and upper die by an electric heater.

BACKGROUND OF THE INVENTION

JP2003-47561A, JP2003-304975A, JP2007-130149A, JP2013-202137A and JP2011-512974A disclose conventional electric cookers in which a lower housing that has a lower die on the upper surface is pivotally mounted to an upper housing that has an upper die on the lower surface via a hinge or a hinge shaft at rear ends, and when dough is inserted or when baked product is taken out, the upper housing turns upward from the lower housing.

In the conventional electric cookers, the following problems occur because of fixed height of the hinge or hinge shaft via which the upper housing is pivotally mounted to turn upward from the lower housing.

It is necessary to change the depth of a concave formed on facing surfaces of the upper and lower dies depending on each baked product, and it is necessary to change thicknesses of the upper and lower dies and height of the upper housing. However, in the electric cookers, the height of the hinge or hinge shaft is fixed and the height of the upper housing cannot be changed. If another upper or lower die that is different in height is attached, a gap can be produced without tightly contacting the surfaces of the upper and lower dies. The dough in the concaves between the upper and lower dies seeps out of the concaves during baking, so that the dough is not baked to a fixed shape or varies in baking, which is disadvantageous.

In order to solve the disadvantages, it is necessary to substitute another different-height hinge to match thickness of the upper and lower dies or to change the heights of the upper and lower housings or to manufacture a plurality of electric cookers in exclusive use for each baked product. However, it is necessary to replace it depending on thickness of the upper and lower dies every time, which is complicated and expensive. If a plurality of electric cookers is manufactured for each baked product, it will increase manufacturing costs significantly.

In view of the disadvantages, it is an object to provide an electric cooker in which a different-thickness upper or lower die is properly mounted in the single electric cooker without substituting a hinge or an upper or lower housing or without manufacturing an electric cooker in exclusive use for each baked product.

DETAILED DESCRIPTION OF PREFERRED EMBODIMENTS

Embodiments of the invention will be described with respect to the drawings.

Figure 1:
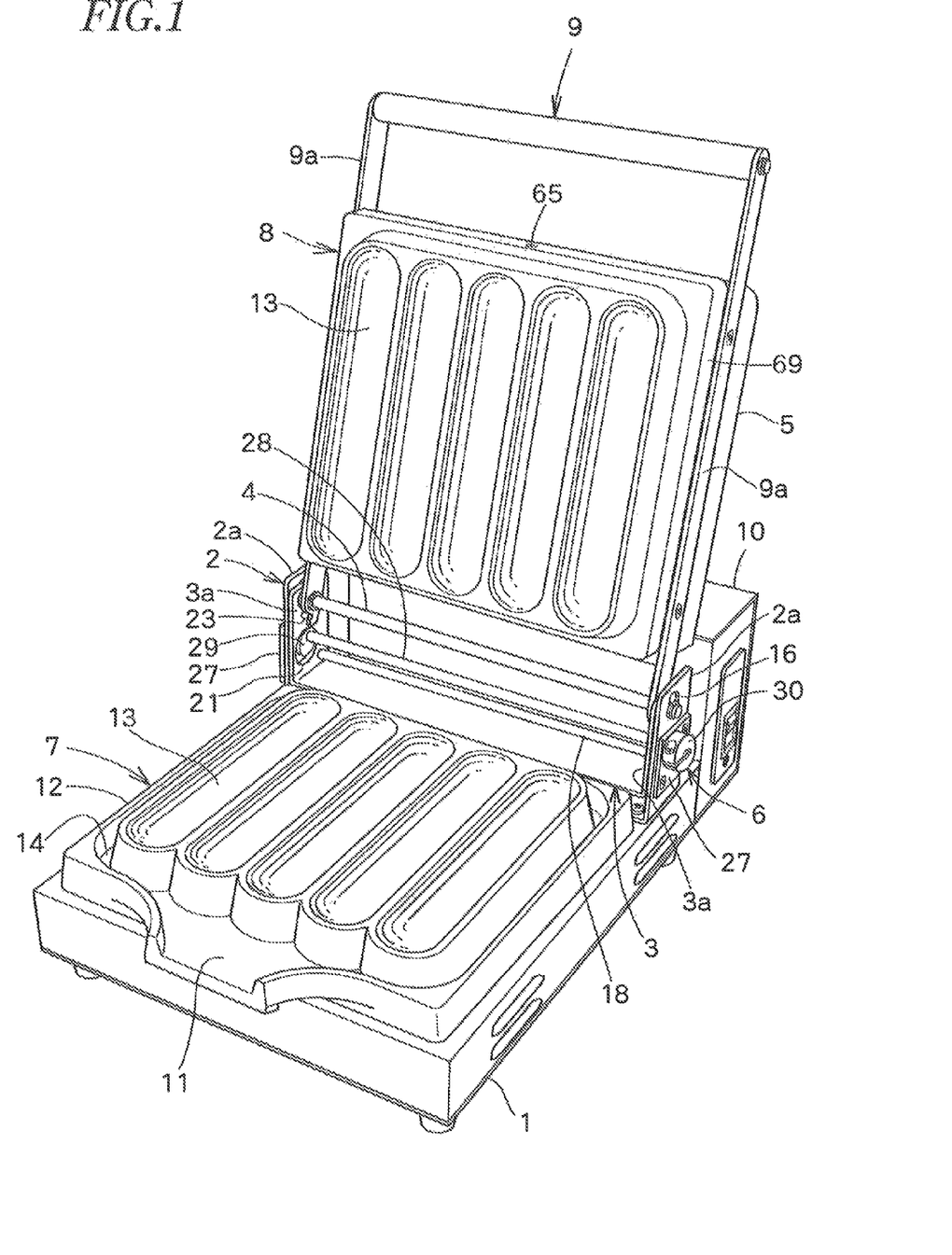
FIG. 1 is a front perspective view of one embodiment of an electric cooker according to the present invention when an upper housing turns upward.
Figure 2:
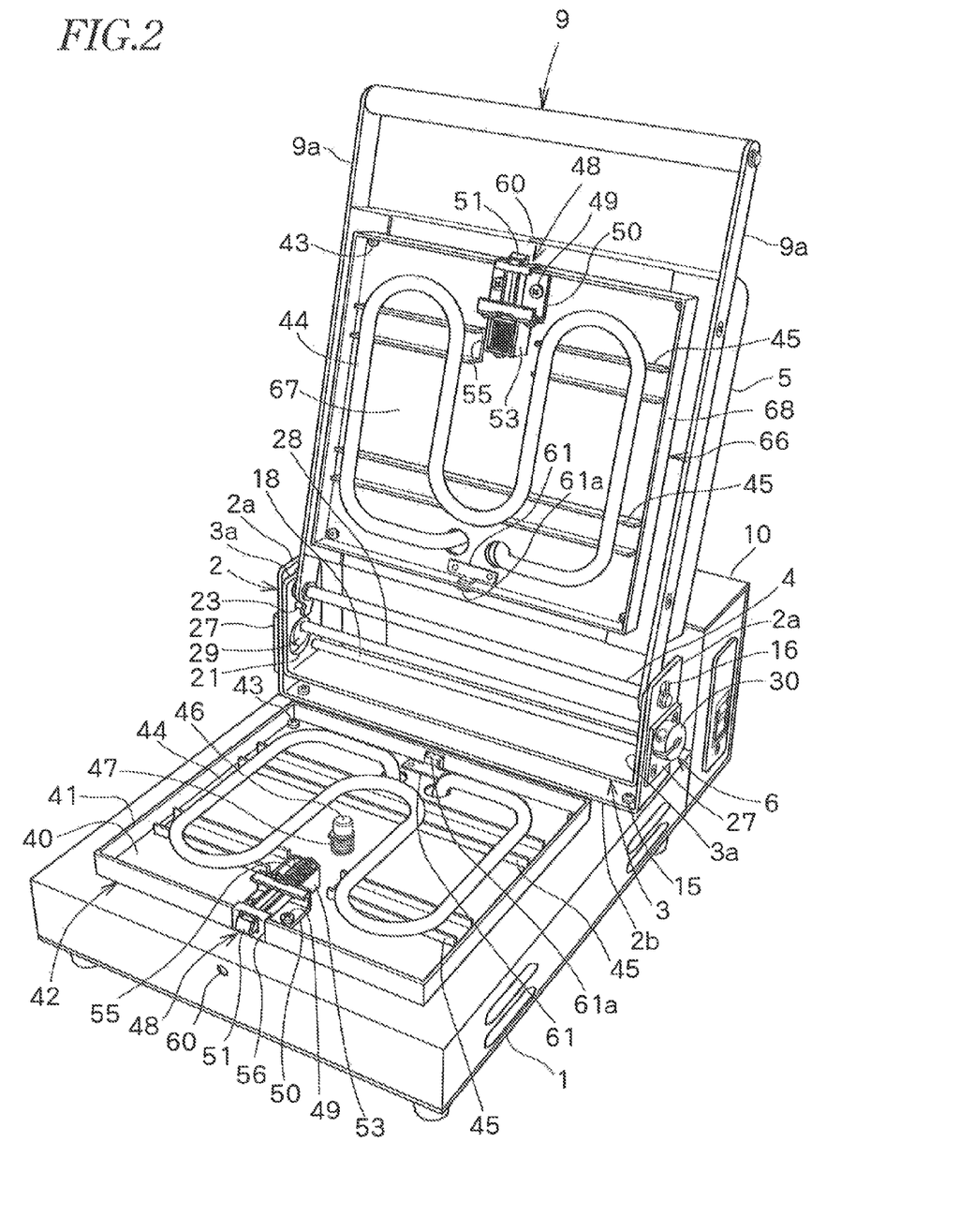
FIG. 2 is a front perspective view of the same when upper and lower dies are removed.
Figure 4:
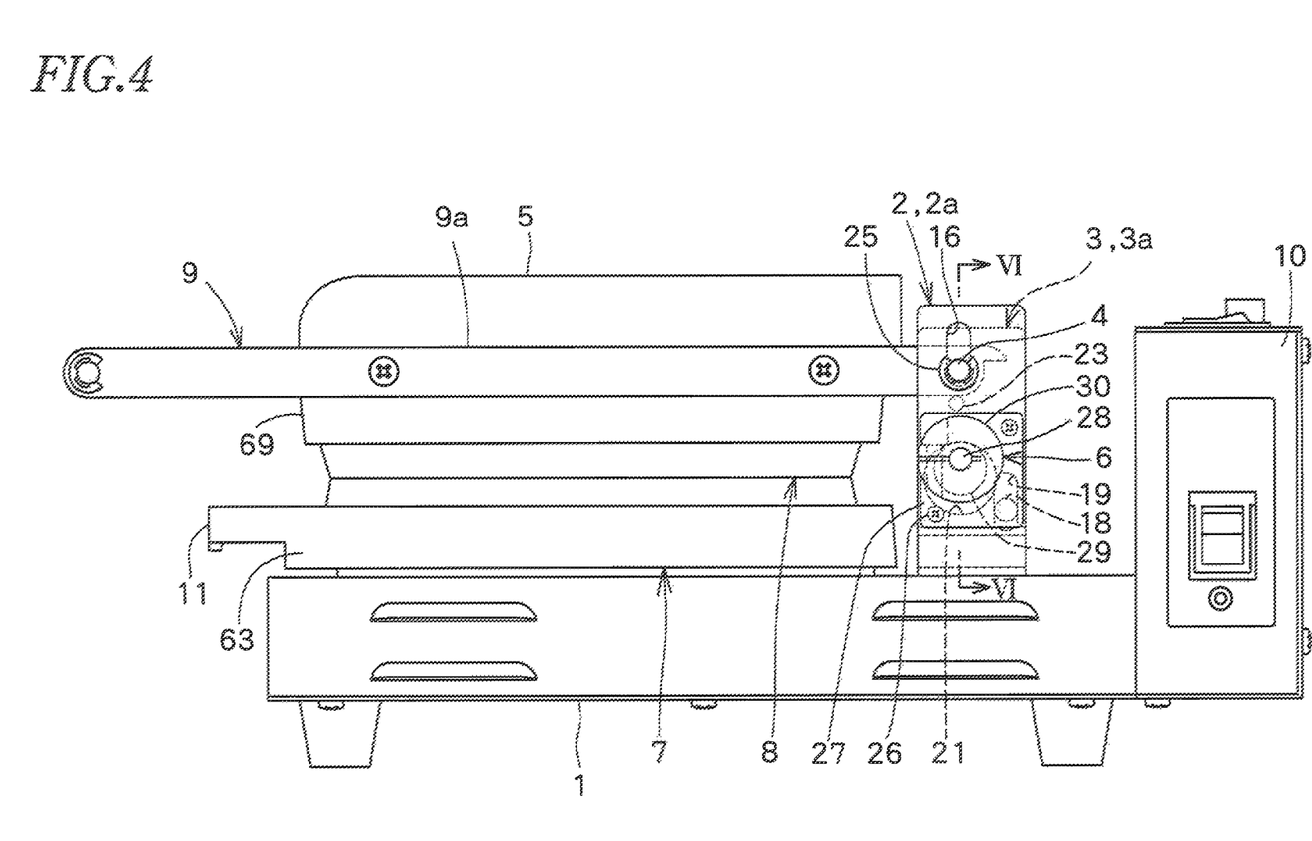
FIG. 4 is a side elevational view when the height of a hinge shaft is set to a lower-limit position and the upper housing moves downward in use.

In FIGS. 1, 2 and 4, an electric cooker according to the present invention comprises a rectangular lower housing 1; an upper-housing support bracket 2 fixed to the back of the upper surface of the lower housing 1; a U-shaped moving bracket 3 moving vertically between a pair of upward portions 2a and 2a of the upper-housing support bracket 2; a rectangular upper housing 5 the rear end of which is pivotally mounted via a hinge shaft 4 to a pair of hinge-shaft support portions 3a, 3b of the moving bracket 3; a hinge-shaft height adjusting unit adjusting height of the hinge shaft 4 with the moving bracket 3; a lower die 7 mounted on the upper surface of the lower housing 1; and an upper die 8 on the lower surface of the upper housing 5. In the following description, front and back, right and left and upward and downward directions are defined in a state where the upper die 8 is on the lower die 7 in use in FIG. 4 by turning the upper housing 5 downward.

The upper housing 5 is fixed between right and left side plates 9a and 8a of a laterally U-shaped handle 9 to be substantially integral with the handle 9. The rear ends of the right and left side portions 9a, 9a pass through the hinge shaft 4, so that the upper housing 5 turns from a substantially horizontal used position to a standby position at over 90 degrees such as 100 degrees upward. On the back surface of the lower housing 1 is mounted a control box 10 having a power switch, a heater-temperature regulating switch and a timer switch (not shown).

The lower die 7 is made like a square of high thermally-conductive Al alloy, and an oil-collecting recess 11 projects forward in the middle of the front edge. The outer periphery except the front edge of the oil-collecting recess 11 is surrounded by an upward portion 12, and a plurality of dough-baking concaves 13 having a semicircular section is formed on the upper surface of the lower side 7 except the outer periphery.

Around the concaves 13 of the lower die 7 or between the upward portion 12 and the concaves 13, a concave oil-discharge groove 14 that communicates with the oil-collecting recess 11 is formed. The bottom surface of the oil-discharge groove 14 and the upper surface of the oil-collecting recess 11 are gently inclined forward and downward. So, oil which runs out of the baked dough flows to the oil-collecting recess 11 via the oil-discharge groove 14. Oil which drops down from the front edge of the oil-collecting recess 11 can be collected by an oil reservoir (not shown).

The upper die 8 is made of Al alloy like a square. On the lower surface of the upper die 8 facing the upper surface of the lower die 7, there is formed a plurality of concaves 13 having a semicircular cross section and facing the concaves 13 of the lower die 7.

Figure 3:
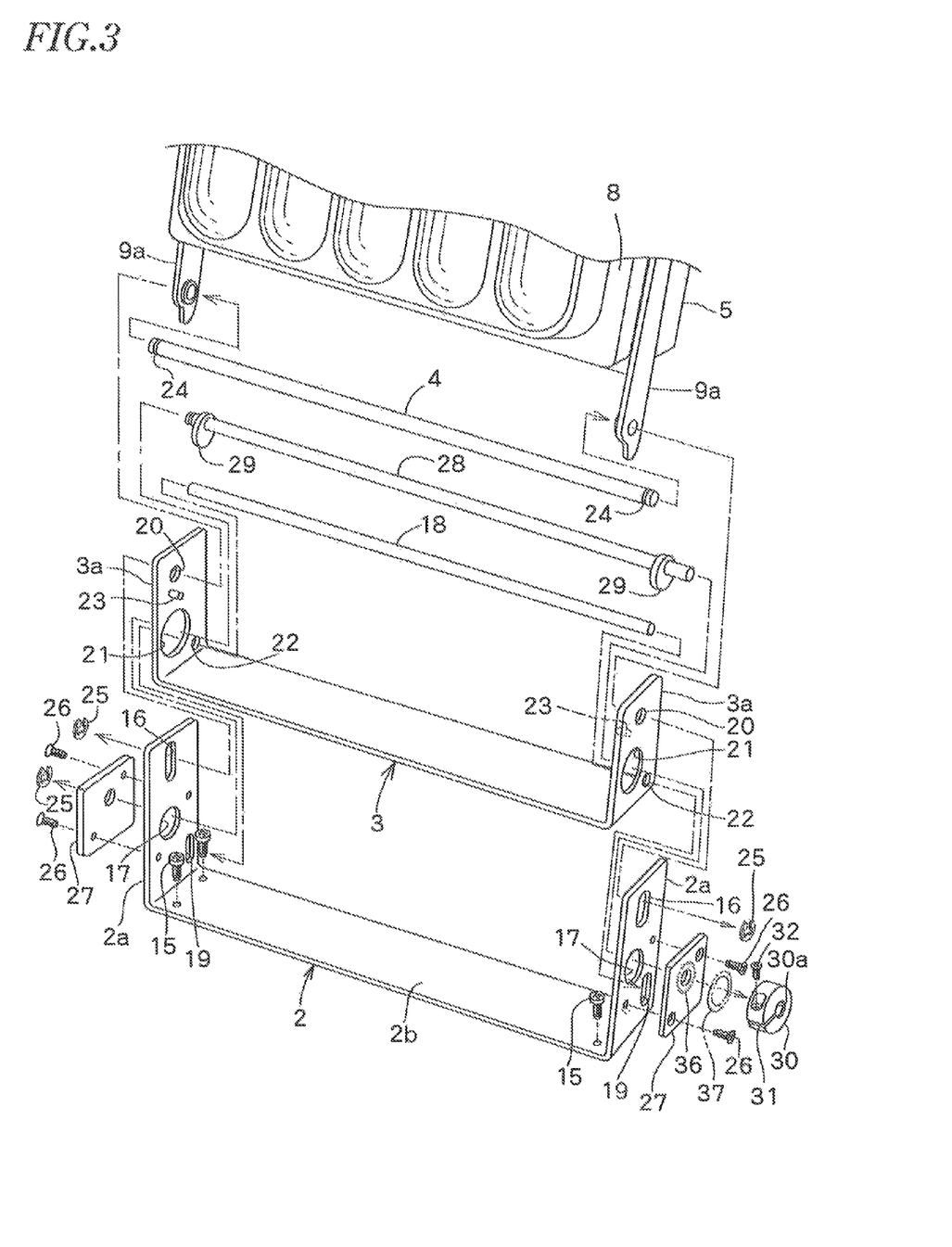
FIG. 3 is an exploded perspective view of hinge-shaft height adjusting unit and its mounting portion.
Figure 6:
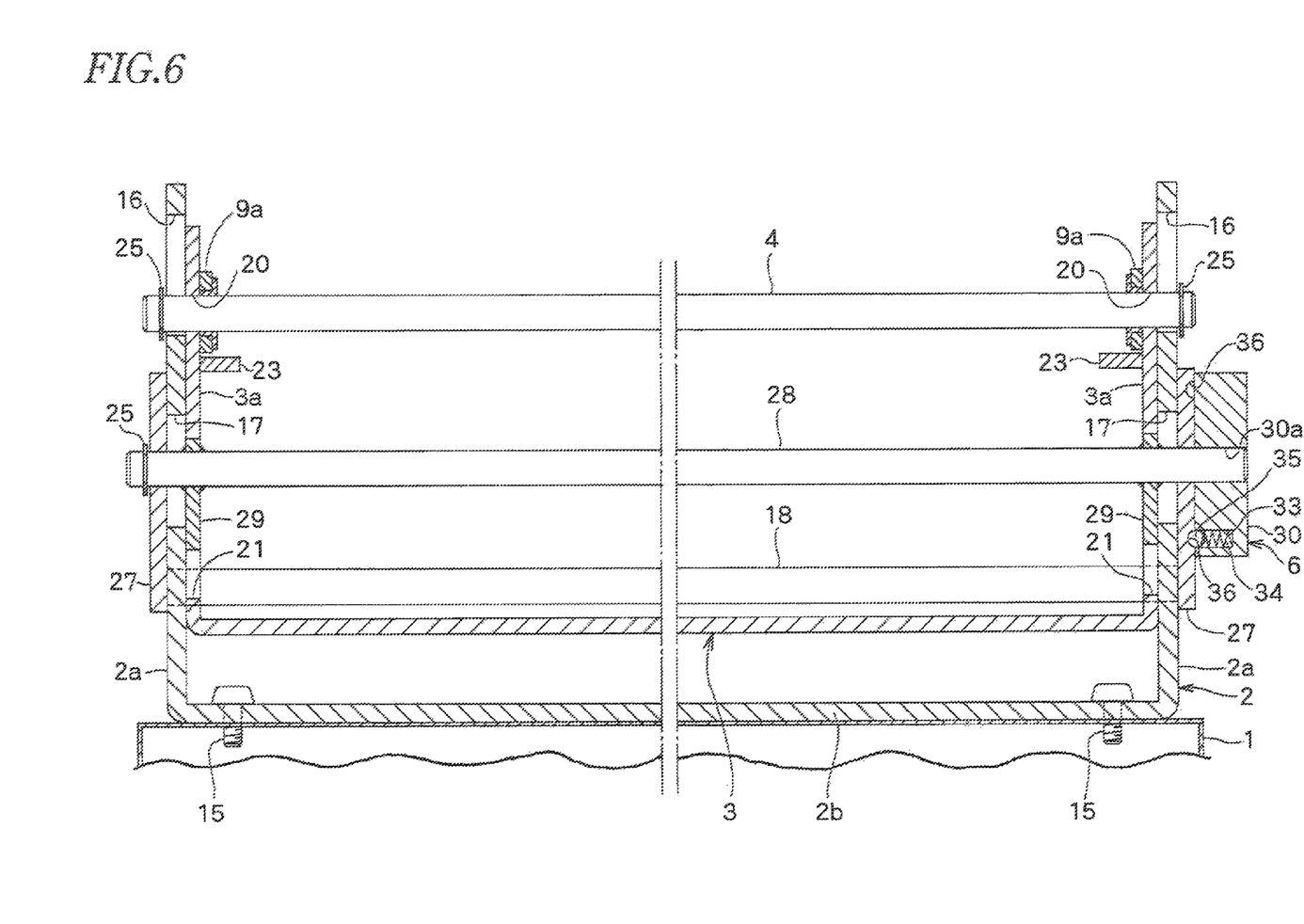
FIG. 6 is an enlarged vertical sectional front view taken along the line VI-VI in FIG. 4.

In FIGS. 3, 4 and 6, the right and left ends of a base of the upper-housing support bracket 2 are fixed to the rear portion of the upper surface of the lower housing 1 with a plurality of screws 15. At the upper ends of the pair of upward portions 2a, 2a of the upper-housing support brackets 2, there are formed first guide holes 16, 16 for guiding the right and left ends of the hinge shaft 4 vertically. In the middle of the upward portions 2a, there are formed circular holes 28 in which an operating rod 28 and an eccentric cam 29 fixed thereto can be inserted. At the lower end of the rear part of the upward portions 2a, there are formed second guide holes 19, 19 in which guide rods 18 in parallel with the hinge shaft 4 fit, so that the lower end of the moving bracket 3 moves vertically.

At the upper ends of the pair of hinge-shaft support portions 3a, 3a of the moving bracket 3, there are formed support holes 20, 20 that support each end of the hinge shaft 4. Under the support holes 20, there are formed circular holes 21, 21 which are larger in diameter than the eccentric cam 29 which passes through the circular hole 21. At the lower end of the rear portion of the hinge-shaft support portion 3a, there are formed through holes 22, 22 through which each end of the guide rod 18 passes. Stopper pins 23, 23 project inward on front and upper part of facing surfaces of the right and left hinge shaft support portions 3a and come in contact with the right and left side portions 9a of the operating handle 9.

In FIG. 6, the right and left ends of the hinge shaft 4 fit in the support holes 20, 20 of the right and left hinge-shaft support portions 3a, 3a of the moving bracket 3 and in the first guide holes 16, 16 of the right and left upward portions 3a, 3a of the upper-housing support bracket 3. A snap ring 25 fits in a circumferential groove 24 of each end of the hinge shaft 4 at a projecting end of the upward portion 2a.

The right and left ends of the guide rod 18 fit in the through holes 22, 22 of the right and left hinge-shaft support portions 3a, 3a of the moving bracket 3 and in the second guide holes 19, 19 of the right and left upward portions 2a, 2a of the upper-housing support bracket 2, so that the guide rod 18 is allowed to move right and left and prevented from coming off. Each end of the guide rod 18 fits in the through holes 22, 22 of the right and left hinge-shaft support portions 3a, 3a and in the second guide holes 19, 19 of the right and left upward portions 2a, 2a of the upper-housing support bracket 2, so that the moving bracket 3 is prevented from turning forward and backward, and is allowed to move vertically with respect to the upper-housing support bracket 2.

A hinge-shaft height adjusting unit 6 comprises the operating rod 28 in parallel with the hinge shaft 4; a pair of disc-like eccentric cams 29, 29 fixed eccentrically with the right and left side ends of the operating rod 28; and a knob 30 for turning the operating rod 28 and the eccentric cams 29.

In FIG. 6, the right and left eccentric cams 29 fit in the circular holes 21 of the right and left hinge-shaft support portions 3a of the moving bracket 3 with play. Before a shaft-retaining plate 27 is mounted to the upper-housing support bracket 2, the operating rod 20 and eccentric cam 29 are fitted by inserting into any one of the circular holes 17 in the right and left upward portions 2a. The left end of the operating rod 28 passes through the left upward portion 2a and the shaft-retaining plate 27 fixed thereto and slightly projects. The snap ring 25 engages on the projecting end thereby preventing the operating rod 28 from moving rightward.

The right end of the operating rod 28 projects rightward through the right upward portion 2a and the shaft-retaining plate 27 fixed thereto, and the knob 30 is fixed at the projecting end. A slit 31 is formed in the knob radially from a central hole 30a to an outer circumference. A screw 32 engages toward the slit 31 to make width of the slit 31 narrower, and the knob 30 is thus fixed to the operating rod 28. By turning the knob 30, the right and left eccentric cams 29 rotate with the operating rod 28, and the eccentric cams 29 eccentrically rotate within the circular holes 21 of the right and left hinge-shaft support portions 3a. Thus, the moving bracket 3 moves vertically. Vertical movement of the moving bracket 3 makes height of the hinge shaft 4 supported by the bracket 3 and the upper housing 5 around the hinge shaft 4 adjustable.

On a surface of the knob 30 facing the shaft-retaining plate 27, there is formed a lateral blind hole 33 which is open toward the shaft-retaining plate 27. In the blind hole 33, a compression spring 34 and a steel ball 35 pressed by the compression spring 34 toward the shaft-retaining plate 27 are held. On a surface of the shaft-retaining plate 27 facing the knob 30, there is a plurality of semicircular sectional fitted grooves 36 in which the ball 35 fits in and out around the operating rod 28 in FIG. 3. The compression spring 34, the ball 35 and a plurality of fitted grooves 36 constitute a resistance-applying unit for applying rotation-resistant force to the knob 30. That is to say, the ball 35 selectively fits in any one of the grooves 36, and rotation-resistant force is applied to the knob 30. The operating rod 28 and the eccentric cam 29 are stopped stepwise without turning. Therefore, the hinge shaft 4 and upper housing 5 adjusted at an optional height are not likely to move vertically and held at a predetermined height.

Instead of such resistance-applying unit, a wave washier 37 or a leaf spring (not shown) may be axially compressed and inserted between the shaft-retaining plate 27 and the knob 30 to apply rotation-resistant force to the knob 30. The wave washier 37 stops the rotation of the knob 30, operating rod 28 and eccentric cam 29 continuously thereby enabling height of the hinge shaft 4 and upper housing 5 to be adjusted minutely.

In FIGS. 2 and 8-10 in which the lower die 7 and upper die 8 are removed, a lower-die holding member 42 comprising a square bottom plate 40 and an upward frame portion 41 which stands from the bottom plate 40 and is open upward is fixed on the upper surface of the lower housing 1 with screws 43 which engage in four corners of the bottom plate 40.

Figure 8:
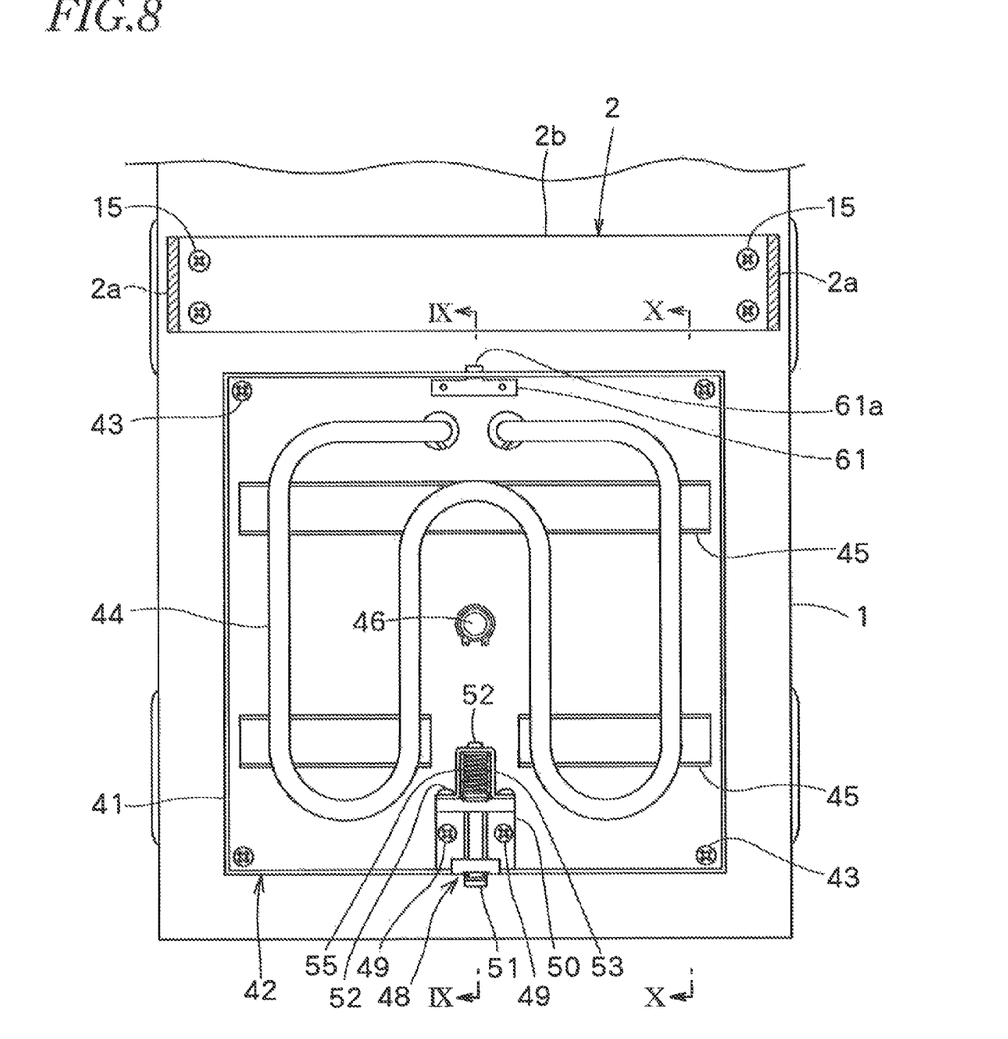
FIG. 8 is a top plan view of the lower housing when a lower die is removed.
Figure 9:
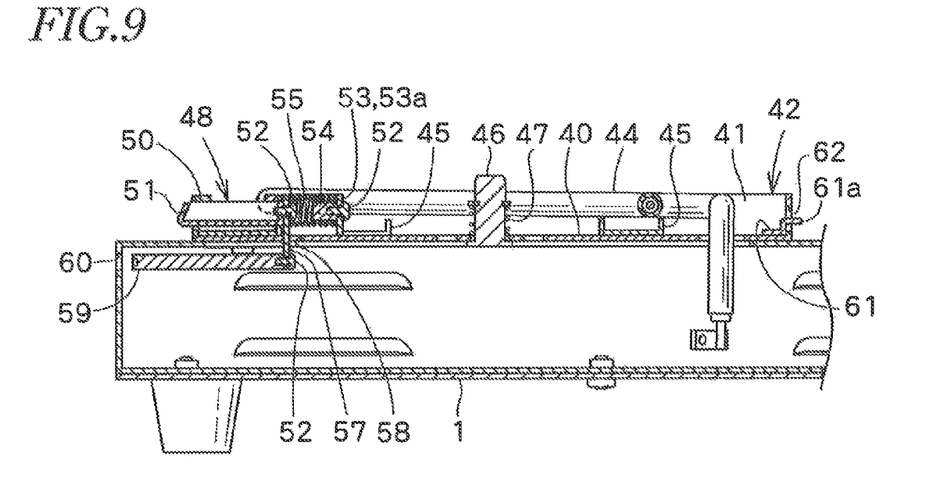
FIG. 9 is an enlarged vertical sectional side view taken along the line IX-IX in FIG. 8.
Figure 10:
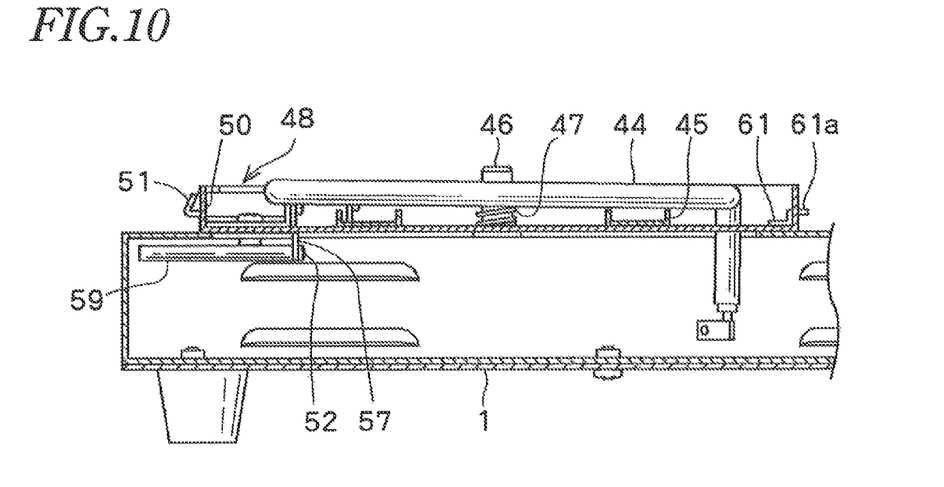
FIG. 10 is an enlarged vertical sectional side view taken along the line X-X in FIG. 9.
Figure 11:
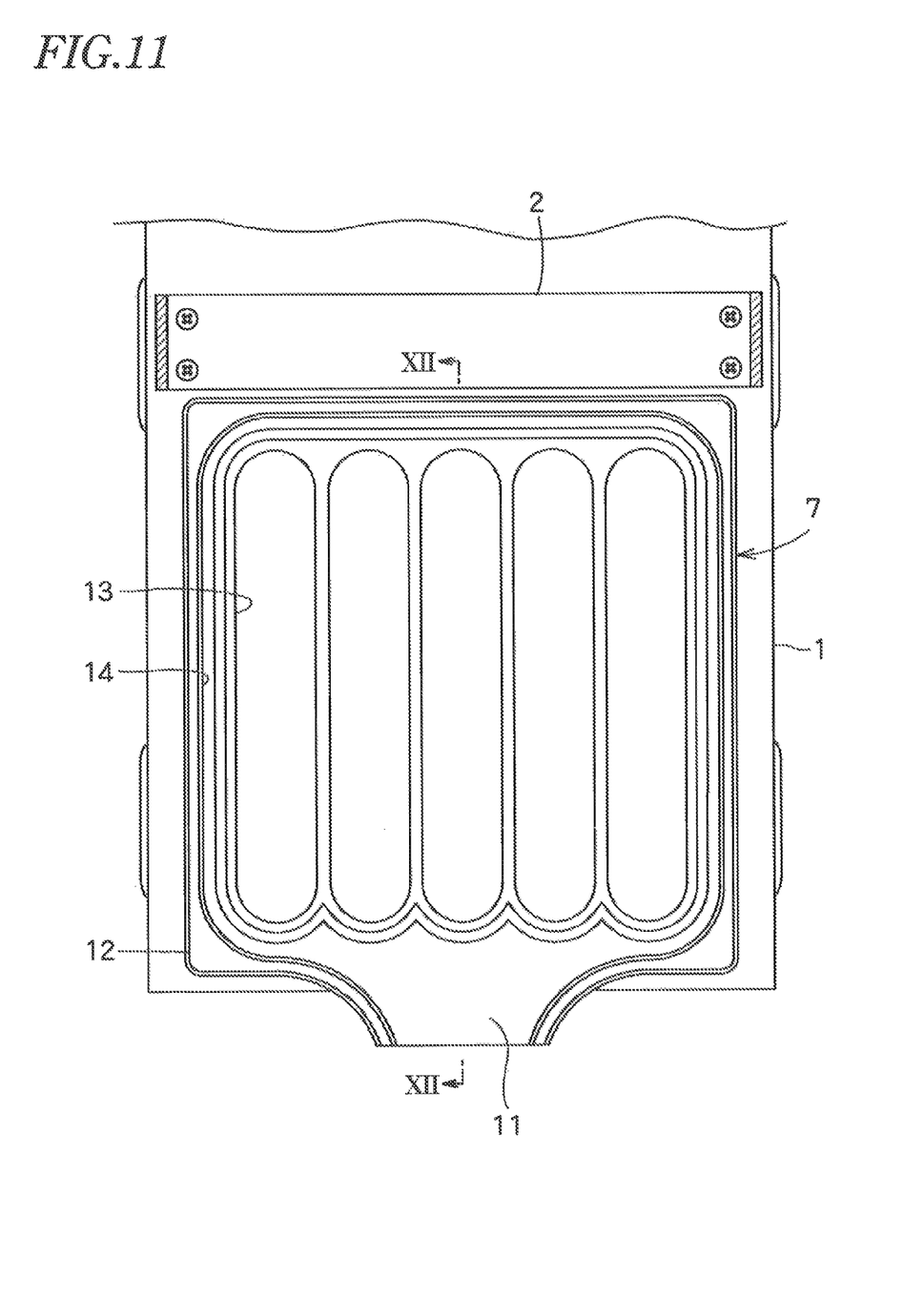
FIG. 11 is a top plan view when the lower die is mounted over the lower housing.

An electric heater 44 which meanders and is supported at the ends by support member (not shown) in the lower housing 1 is spaced from the upper surface of the bottom plate 40 of a lower-die holding member 42 and surrounded by the upward frame portions 41. The electric heater 44 is a sheathed heater and its terminal is electrically connected to a power source in the control box 10. The upper surface of the electric heater 44 slightly projects from the upper end of the upward frame portion 41 and is pressed downward when the lower die 7 is mounted, so that the upper surface is elastically pressed on the lower surface of the lower die 7. Even if the lower surface of the lower die 7 should warp upward by heat, the electric heater 44 will not leave the lower surface, so that lower die 7 is effectively heated.

Under the electric heater 44, a plurality of heater receivers 45 is fixed by spot welding on the bottom surface of the lower-die holding member 42. When the lower die 7 is mounted, the lower surface of the electric heater 44 comes in contact with each of the heater receivers 45, so that the electric heater 44 is held to be substantially horizontal.

A temperature sensor 46 for detecting temperature of the lower die 7 is usually biased upward by a spring 47 at a center of the bottom plate 40. The upper end of the temperature sensor 46 is in elastically pressing contact with the lower surface of the lower die 7 when the lower die 7 is mounted in FIG. 12.

A latch unit 48 is disposed in the middle on the upper surface of the bottom plate 40 of the lower-die holding member 42. The latch unit 48 comprises a substantially U-shaped latch holding member 50 fixed to the upper surface of the bottom plate 40 with screws 49, 49; a latch 51 held on the latch holding member 50 to move forward and backward; a U-shaped spring-holding member 53 fixed to the back surface of the latch holding member 50 with screws 52, 52; a rod-like spring guide 54 fixed on the front surface of a rear portion 53a of the spring-holding member 53 with the screw 52; and a compression spring 55 fitted in the spring guide 54 between the back surface of the latch 51 and the spring-holding member 53 to always bias the latch 51 forward. The front end of the latch 51 is retractable inward and outward of the upward frame portion 41 through a cut-away portion 56 of the upward frame portion 41 and slightly projects by force of the compression spring 55 usually.

In FIG. 9, the upper end of a suspending portion 57 is fixed to rear end of the latch 51 with the screw 52. The suspending portion 57 passes through an elongate hole 58 of the bottom plate 40 and suspends in the lower housing 1. An operating rod 59 for pushing the latch 51 backward is fixed with the screw 52 on the front surface of the suspending portion 57 in the lower housing 1. A circular through hole 60 is formed in the front surface of the lower housing 1 facing the operating rod 59 in FIG. 2. A screw driver or a rod-like tool is put through the through hole 60 to push the operating rod 59 backward thereby moving the latch 51 backward via the suspending portion 57. The operation is carried out when the lower die 7 is removed from the lower-die holding member 4 as described later.

An engagement metal fitting 61 is fixed across the latch unit 48 on the rear end of the bottom plate 40 and has a projection 61a at the rear end. The projection 61a passes through an opening 62 of the upward frame portion 41 and projects backward from the upward frame portion 41 in FIGS. 8-10.

Figure 12:
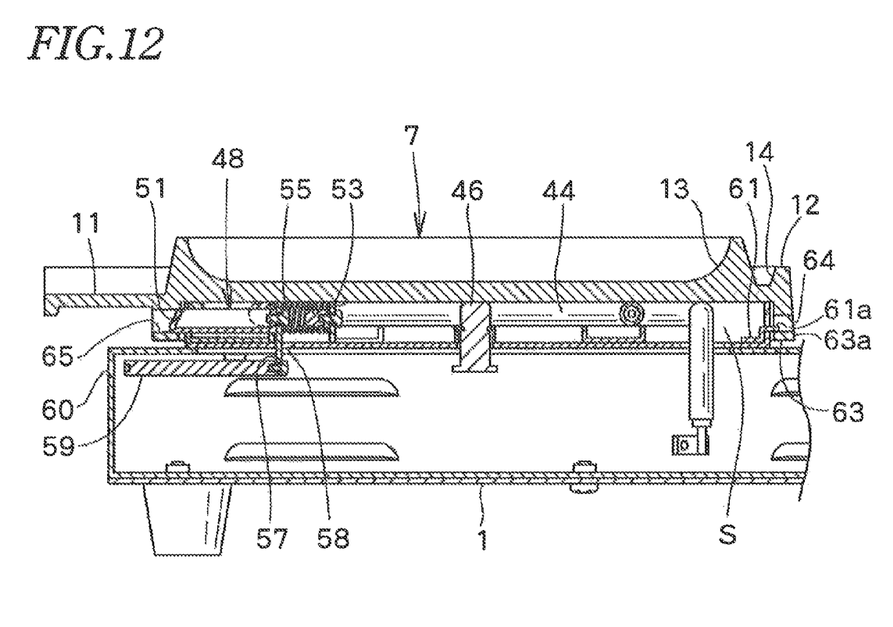
FIG. 12 is an enlarged vertical sectional side view taken along the line XII-XII in FIG. 11.

In FIGS. 1, 4 and 12, on the circumference of the lower surface of the lower die 7, there is a suspending portion 63 which covers the upward frame portion 41 of the lower-die holding member 42 from above. In the middle of a rear portion 63a and a front portion 63b of the suspending portion 63 across each other, there are formed a first engagement hole 64 and a second engagement hole 65 respectively. The first engagement hole 64 and the second engagement hole 65 engage with a rear projection 61a at the rear of the upward frame portion 41 and the front end of the latch 51 at the front of the upward frame portion 41 respectively.

After the projection 61a fits in the first engagement hole 64, the suspending portion 63 of the lower die 7 covers the upward frame portion 41. The lower edge of the front portion 63b of the suspending portion 63 comes in contact with a front inclined surface of the latch 51 and the latch 51 is slightly moved backward. When the front end faces the second engagement hole 65, the latch 51 is moved forward again by the compression spring 55, and the front end of the latch 51 moves into the second engagement hole automatically. Thus, the lower die 7 can easily be installed on the lower-die holding member 42. As mentioned above, a screw driver is inserted into the through hole 60 of the lower housing 1, and the latch 51 is pushed backward via the operating rod 59, so that the only lower die 7 can be removed. By inserting the screw driver into the second engagement hole 65 from front, the latch 51 is directly pushed backward, thereby removing the lower die 7.

The latch 51 of the latch unit 48, the second engagement hole 65 which engages with and disengages from the latch 48, the projection 61, the first engagement hole 64 in which the projection 61a engages and the operating rod 59 constitute an engagement unit according to the present invention.

When the lower die 7 is mounted on the upward frame portion 41, the lower surface of the lower die 7 is close to or is in contact with the upper end opt the upward frame portion 41, so that an upper opening surface of the upward frame portion 41 is closed. There is formed a space S between the bottom plate 40 of the lower-die holding member 42 and the lower surface of the lower die 7, and the electric heater 44 is housed in the space S in FIG. 12.

In FIG. 2, an upper-die holding member 66 which is the same in shape as the lower-die holding member 42 and is symmetrical vertically is fixed on the lower surface of the upper housing 5 with screws 43. The upper-die holding member 66 comprises an upper plate 67 and a square downward frame portion 68 which suspends from the circumference of the upper plate 67 and has a lower opening.

An electric heater 44 which is the same in shape as the lower electric heater 44 is housed in a space surrounded by the downward frame portion 68. One of the electric heaters 44 may be omitted depending on baked products.

A heater receiver 45, a latch unit 48 and an engagement metal fitting 61 which are the same in shape as and are symmetrical with those in the lower holding member 42 mounted on the upper plate 67. The latch unit 48 etc. have the same structure as those in the lower die 1, and the details are not described.

In FIGS. 1 and 4, on the circumference of an upper surface of the upper die 8, a standing portion 69 which covers the downward frame member 68 projects, and a first engagement hole 64 and a second engagement hole 65 the same as those in the lower die 7 are formed on the standing portion 69. The first engagement holes are not shown.

To attach the upper die 8 on the upper holding member 66, the same way as in the lower die 7 can be carried out. After the first engagement hole 64 of the upper die 8 covers a projection 61a, the standing portion 69 of the upper die 8 fits on the downward frame portion 68 and the second engagement hole 65 comes in contact with the front end of the latch 51. Thus, the upper die 8 can easily be attached on the upper-die holding member 66 as well as the lower die 7. A screw driver is inserted into a through hole 60 in the front surface of the upper housing 5. An operating rod 59 is pushed and the latch 51 is pushed backward as well as in the lower die 7, so that the only upper die can easily be removed.

The upper die 8 is attached on the downward frame portion 68, and the lower opening of the downward frame portion 68 is closed by the upper surface of the upper die 8. A space for the electric heater 44 is formed under the upper housing 5.

In order to bake bread and snack cakes using the electric cooker in the foregoing embodiment, while the upper die 5 turns upward in FIG. 1, oil is applied on the concaves 13 of the lower die 7 if necessary, and formerly kneaded dough is put in.

Then, in FIG. 4, The upper housing 7 is turned downward, and the upper and lower concaves are closed by tightly contacting the lower surface of the upper die 8 on the upper surface of the lower die 7. Thereafter, an electric current flows through the upper and lower electric heaters 44, and the lower and upper dies 7, 8 are heated. Then, the dough is heated and expanded in the concaves 13 in the lower die 7 and the upper die 8, so that rod-like bread or snack cakes are baked.

Oil which runs out of the dough during baking is guided to the oil-collecting recess 11 via the oil-discharge groove 14 of the lower die 7 and collected in an oil reservoir.

Depending on the kind of baked product, in order to replace one or both of the lower die 7 and the upper die 8 with a different-thickness die, the heights of the hinge shaft 4 and upper housing 5 are adjusted by the hinge-shaft adjusting unit 5. In FIGS. 1, 2, 4 and 6, the lower die 7 and upper die 8 are selected as minimum thickness at which the electric cooker in the embodiment is used. So the heights of the hinge shaft 4 and upper housing 7 are determined at the lower limit position. From the position, in order to adjust the height of the hinge shaft 4 and upper housing 5 to the upper limit position, the knob 30 is turned by 180 degrees clockwise or counterclockwise in FIGS. 5 and 7.

Figure 7:
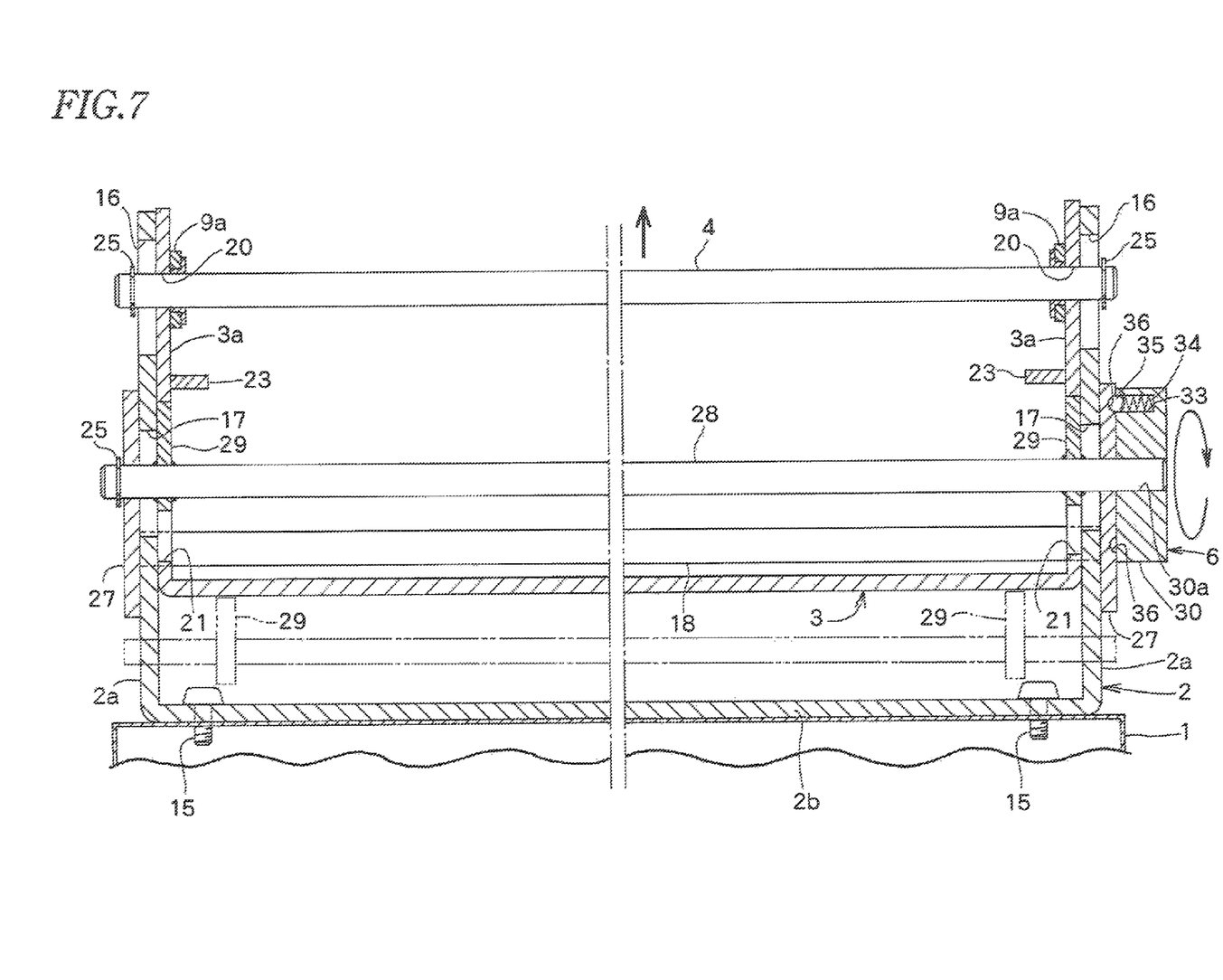
FIG. 7 is an enlarged vertical sectional front view taken along the line VII-VII in FIG. 5.

With turning of the knob 30 by 180 degrees, the operating rod 28 and eccentric cams 29, 29 fixed at each end of the rod 28 are turned by 180 degree. Each of the eccentric cams 29, 29 eccentrically rotates within the circular hole 21 of the hinge-shaft support portion 3a of the moving bracket 3. In FIG. 7, the maximum distant portion of the eccentric cam 29 around the operating rod 28 rotates along the inner circumferential surface of the circular hole 21 from the lower-limit position to the upper-limit position. Hence, the moving bracket 3 is raised with the right and left eccentric cams 21.

Figure 5:
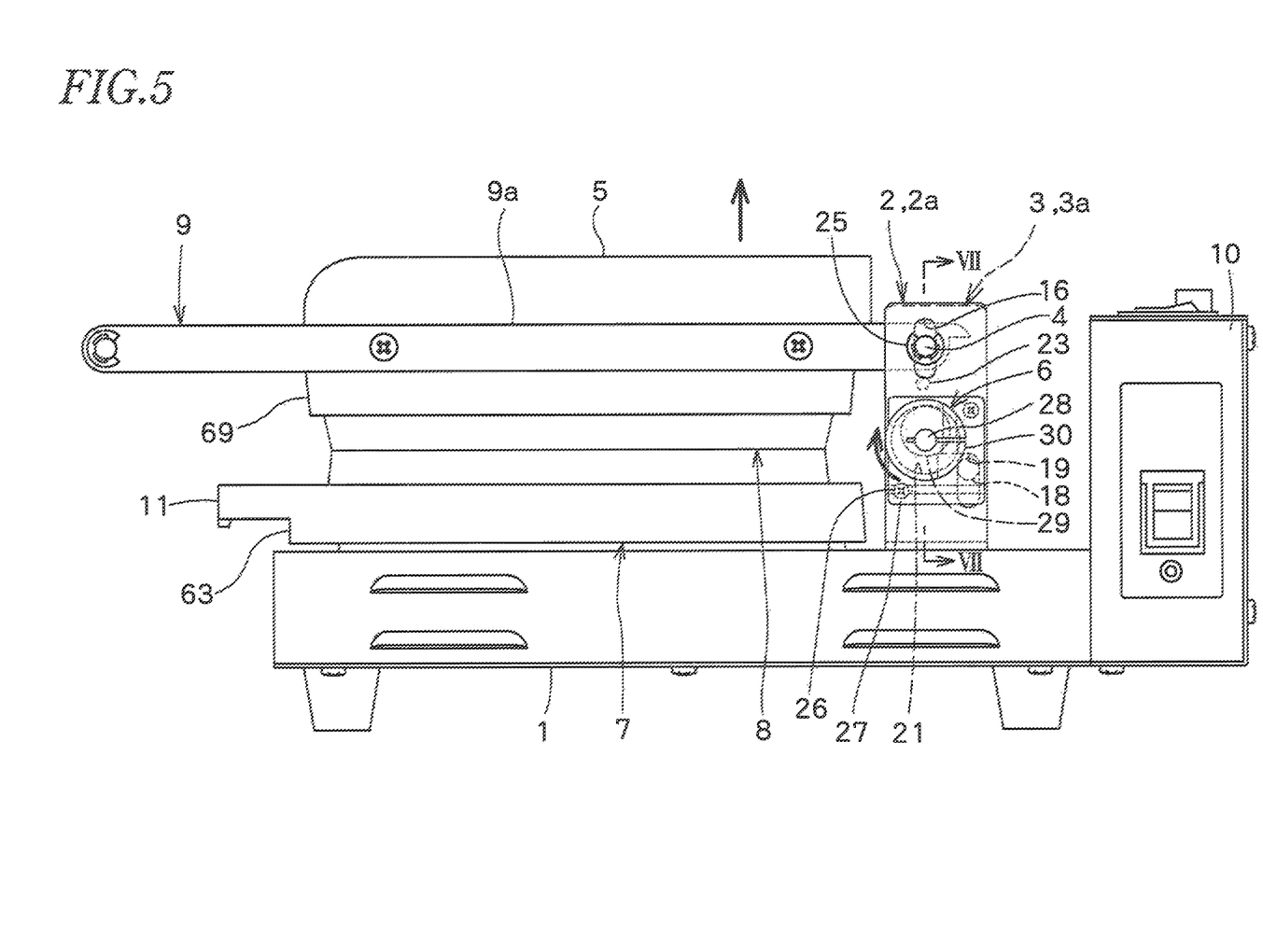
FIG. 5 is a side elevational view when the height of the hinge shaft is set to an upper-limit position and the upper housing moves downward in use.

With the raised moving bracket 3, the hinge shaft 4 supported by the right and left hinge-shaft support portions 3a and the upper housing 5 pivotally mounted to the hinge shaft 4 are moved together to the upper limit position, and the upper housing 5 in FIG. 5 becomes higher than that in FIG. 4 with respect to the lower housing 4. Thus, one or both of the lower die 7 and upper die 8 can be replaced with a thicker one than that in FIG. 4. Even if it is replaced with the thicker one, the lower die 7 can tightly contact the upper die 8 at facing surfaces thereby providing suitable use.

When the knob 20 turns by 180 degrees, the ball 35 elastically gets into the highest engagement groove 36 of the shaft-retaining plate 87, and rotation-resistant force is applied to the knob 30 thereby preventing the eccentric cam 29 from turning. Thus, the hinge shaft 4 and upper housing 5 set at the upper limit position are not likely to move down in use.

The foregoing description relates to a case where the hinge shaft 4 and upper housing 5 pivotally mounted to the hinge shaft 4 are set at the upper-limit position. If the knob 30 turns at less than 180 degrees, the hinge shaft 4 and upper housing 5 can be adjusted at an optional height between the lower-limit and upper-limit positions.

Figure 13:
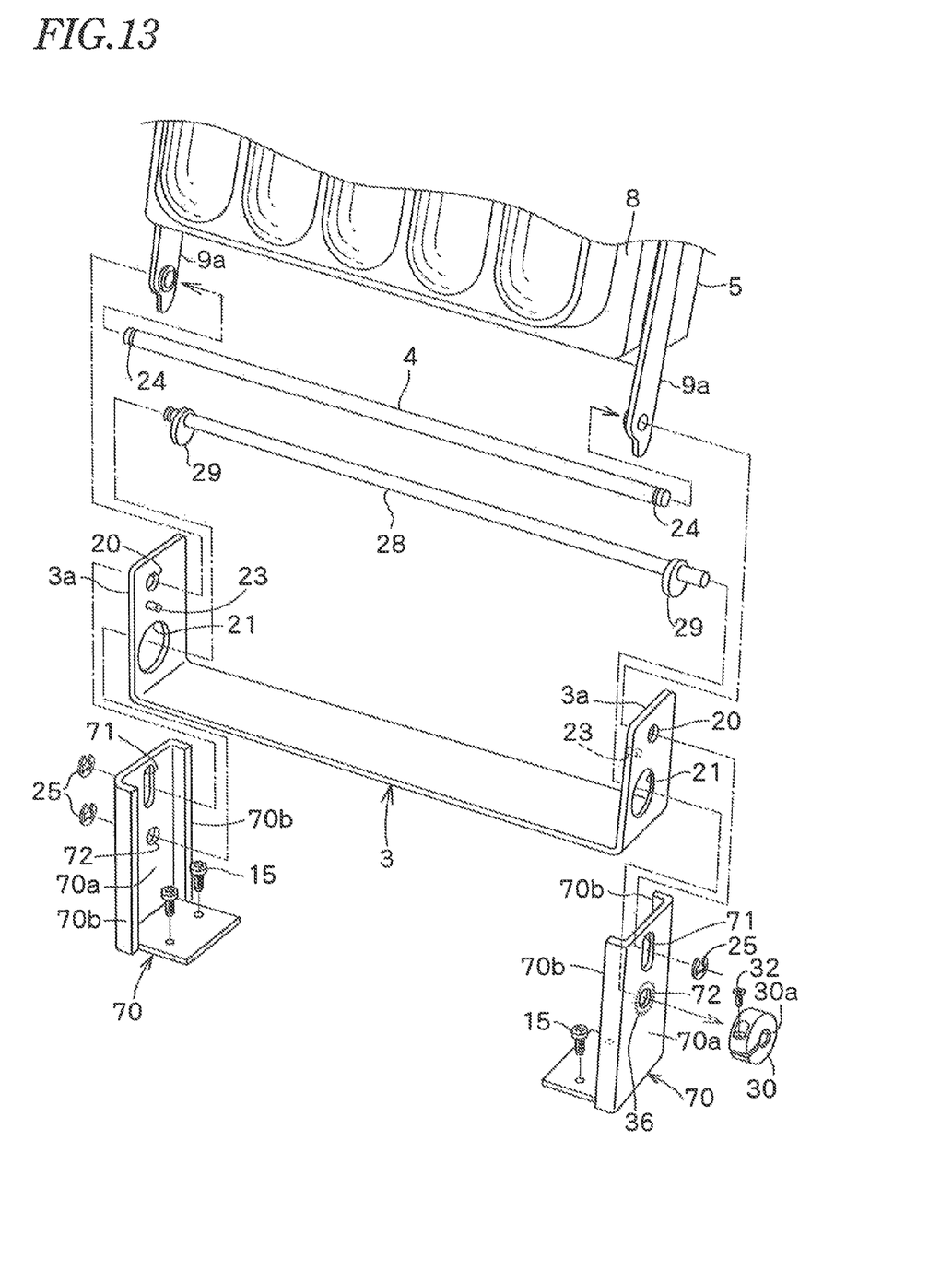
FIG. 13 is an exploded perspective view of a variation of a mounting portion for hinge-shaft height adjusting unit.

FIG. 13 is an exploded perspective view showing another embodiment of a mounting portion of the hinge-shaft height adjusting unit 6.

In this embodiment, a pair of L-shaped upper-housing support brackets 70, 70 is fixed to the lower housing with a screw 15, and inward guide portions 70b, 70b are provided at the front and rear edges of upward portions 70a, 70a of the upper-housing support bracket 70. Hinge-shaft supports 3a, 3a of the moving bracket 3 which is the same in shape as the above are guided vertically by the guide portions 70b, 70b.

Each of the right and left upward portions 70a has a guide hole 71 for guiding the hinge shaft 4 vertically and a through hole 72 through which each end of the operating rod 28 passes.

In this embodiment, the moving bracket 3 is guided vertically by the guide portion 70b of the upper-housing support bracket 70. Thus, the guide rod 18 and shaft-retaining plate 27 are not required.

After the right and left eccentric cams 29 go through the right and left circular holes 21 of the bracket, the right and left upper housing support brackets 70 can be fixed to the lower housing 1 thereby omitting the circular hole 17 through which the eccentric cam 20 passes, in the upward portion 70a as described in the foregoing embodiment. In this embodiment, because the shaft-retaining plate 27 is not provided, a number of engagement grooves 36 for applying rotation-resistant force to the knob 30 are formed on the outer side surface of the upward portion 70a.

In this embodiment, the moving bracket 3 is guided by the guide portion 70b of the upper-housing support bracket 70, but does not turn around the hinge shaft 4. The guide hole 71 for guiding each end of the hinge shaft 4 may be omitted.

As described above, in the electric cooker in the foregoing embodiments, in order to replace the lower die 7 and upper die 8 with another die that differs in thickness, the right and left eccentric cams 29 are rotated by the knob 30 of the hinge-shaft height adjusting unit 6, and the heights of the hinge shaft 4 supported by the moving bracket 3 and the upper housing 5 pivotally mounted on the hinge shaft 4 are adjusted. Even if the lower die 7 and upper die 8 require different thickness, a single electric cooker may be used. That is to say, it is not necessary to replace the hinge and upper and lower dies or to manufacture a plurality of electric cookers for each of baked products to meet the thickness of the lower die 7 and upper die 8 thereby providing a low-cost electric cooker. For users of the electric cooker in the embodiments, it is not necessary to purchase a new electric cooker for each of based products, and a lower die 7 and an upper die 8 may be purchased and replaced thereby reducing costs.

The lower die 7 and upper die 8 can easily be mounted to and removed from the lower housing 1 and upper housing 7 by the engagement unit such as the latch 51 and operating rods 59 thereby facilitating replacement of a lower die and upper die which differ in thickness.

The present invention is not limited to the embodiments. Various changes and modifications may be made without departing from the scope of claims.

As shown by two-dotted lines in FIG. 7, a pair of eccentric cams 29 is in sliding contact with the lower surface of the moving bracket 3, and the lower surface, which is raised by a plurality of eccentric cams 29 and its height is changed. Two or more eccentric cams may be used. A single eccentric cam having greater width can push up the lower surface in the middle of the moving bracket 3.

The hinge shaft 4 may be a pair of shorter hinge shafts. The right and left side portions 9a of the upper housing 5 are pivotally mounted via the right and left hinge shafts.

Another knob is mounted at the left end of the operating rod 28 to rotate the operating rod 28 with two hands.

The support hole 20 for supporting each end of the hinge shaft 4 of the moving bracket 3 is a vertically elongate hole. If baked dough expands, the upper housing 2 can be moved upward.

The invention claimed is:

1. An electric cooker comprising:
   a lower housing;
   a lower die mounted on the lower housing;
   a hinge shaft having a first end and a second end;
   an upper housing pivotally mounted at a rear end, via the hinge shaft, to the lower housing to rotate upward and away from the lower housing;
   an upper die mounted on the upper housing, a lower surface of the upper die being capable of being disposed on an upper surface of the lower die;
   an electric heater disposed in at least one of the lower housing and the upper housing for heating, from an underside, at least one of the lower die and the upper die to heat dough between the lower die and the upper die;
   an upper-housing support bracket having a pair of upward portions disposed on an upper surface of a rear part of the lower housing;
   a moving bracket located between the pair of upward portions of the upper-housing support bracket for sliding movement along inwardly facing surfaces of the upper-housing support bracket, and the moving bracket having a pair of hinge-shaft support portions that support the first and the second ends of the hinge shaft;
   a first operating rod having a first end and a second end pivotally mounted to the upward portions of the upper-housing support bracket at the first and the second ends of the first operating rod to rotate the first operating rod, and the first operating rod being positioned parallel with the hinge shaft; two eccentric cams being eccentrically fixed to the first operating rod, each of the eccentric cams engaging with a respective circular hole in the moving bracket, for moving the moving bracket and simultaneous adjustment of the pair of hinge-shaft support portion, that support the first and the second ends of the hinge shaft, with respect to the upper-housing support bracket; and a single knob fixed to the first end of the first operating rod that projects sideward from the upward portion of the upper-housing support bracket, wherein manual rotation of the single knob, by fingers of a user, causes a corresponding rotation of the first operating rod and both the eccentric cams and rotation of the eccentric cams within the respective circular holes of the moving bracket simultaneously adjusts a position of the pair of hinge-shaft support portions, supported by the moving bracket, with respect to the upper-housing support bracket, and thereby correspondingly adjusts a position of the first and second ends of the hinge shaft, supported by the moving bracket, and the: upper housing, pivotally mounted to the hinge shaft, relative to the lower housing.

2. The electric cooker of claim 1, further comprising a resistant-force applying unit that is disposed between the knob and the upward portion of the upper-housing support bracket facing the knob, the resistant-force applying unit applying rotation-resistant force to the knob to stop the eccentric cams at an optional rotation position and hold the moving bracket, the hinge shaft and the upper housing at the optional rotation position.

3. The electric cooker of claim 1, wherein each of the circular holes is formed in the hinge-shaft support portion of the moving bracket and is greater in diameter than the respective eccentric cam.

4. The electric cooker of claim 1, wherein an upward frame portion is provided on an upper surface of the lower housing and the electric heater is housed by the upward frame portion,
   a downward frame portion being provided on a lower surface of the upper housing,
   a frame-like suspending portion being provided on a lower surface of the lower die and covered by the upward frame portion from above,
   a frame-like standing portion being provided on a lower surface of the upper die and covered by the downward frame portion from below,
   the electric cooker further comprises engagement means that detachably mount:
      the suspending portion of the lower die to the upward frame portion;
      the standing portion of the upper die to the downward frame portion; and
      the lower die to the upward frame portion and the upper die to the downward frame portion.

5. The electric cooker of claim 4, wherein the engagement means comprises:
   a first engagement hole of the suspending portion and the standing portion;
   a projection of the suspending portion and the standing portion configured to fit in the first engagement hole;
   a second engagement hole formed in the suspending portion and the standing portion and located opposite the projection and the first engagement hole;
   a retractable latch provided in the upward frame portion and the downward frame portion, the retractable latch being biased outward away from the upward and downward frame portions to engage detachably the second engagement hole; and
   a second operating rod that partially passes through an upper surface of the lower housing and a lower surface of the upper housing for connection to the retractable latch within the lower housing and the upper housing, an end of the second operating rod being configured to be pushed by a tool through an opening in a side wall of the lower housing and the upper housing to release the retractable latch from the second engagement hole.

* * * * *